United States Patent
Fortunato et al.

(10) Patent No.: US 12,444,976 B2
(45) Date of Patent: Oct. 14, 2025

(54) SYSTEM AND METHOD FOR WIRELESS POWER TRANSMISSION

(71) Applicants: Christian Fortunato, Gilbert, AZ (US); Ivan Ermanoski, Tempe, AZ (US); Spring Berman, Scottsdale, AZ (US)

(72) Inventors: Christian Fortunato, Gilbert, AZ (US); Ivan Ermanoski, Tempe, AZ (US); Spring Berman, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 663 days.

(21) Appl. No.: 17/876,415

(22) Filed: Jul. 28, 2022

(65) Prior Publication Data
US 2023/0031257 A1 Feb. 2, 2023

Related U.S. Application Data

(60) Provisional application No. 63/226,663, filed on Jul. 28, 2021.

(51) Int. Cl.
*H02J 50/00* (2016.01)
*B64D 47/00* (2006.01)
*G05D 1/00* (2006.01)

(52) U.S. Cl.
CPC ............ *H02J 50/005* (2020.01); *B64D 47/00* (2013.01); *G05D 1/104* (2013.01)

(58) Field of Classification Search
USPC ........................................................ 320/108
See application file for complete search history.

(56) References Cited

U.S. PATENT DOCUMENTS

| | | | |
|---|---|---|---|
| 2022/0091619 A1* | 3/2022 | Wake | B64U 30/20 |
| 2022/0169401 A1* | 6/2022 | Di Cosola | B64U 70/95 |

FOREIGN PATENT DOCUMENTS

| | | |
|---|---|---|
| CN | 106628114 A | 5/2017 |
| KR | 101716487 B1 | 3/2017 |
| WO | 2017/143431 A1 | 8/2017 |

OTHER PUBLICATIONS

Tiurlikova, Aleksandra et al., "Wireless power transfer from unmanned aerial vehicle to low-power wide area network nodes: Performance and business prospects for LoRaWAN", International Journal of Distributed Sensor Networks, 15(11), pp. 1-14 (2019).

* cited by examiner

*Primary Examiner* — Bryce M Aisaka
(74) *Attorney, Agent, or Firm* — FULLER IP LAW; Rodney J. Fuller

(57) ABSTRACT

A system for wireless power transmission is disclosed, and includes a plurality of UAVs, each having a transfer medium reservoir, an onboard power conversion unit, a communication module, a navigation module, a power delivery interface, and at least one sensor. Each UAV is configured to interface with a transfer medium source, receive a chemical power transfer medium into the transfer medium reservoir, fly to a target area containing a power recipient having a power demand, identify and land within a landing zone, provide chemical power transfer medium to an endpoint power conversion, and evaluate at least one directive to decide what action to take based on feedback. The system also includes a fleet control system communicatively coupled to the plurality of UAVs and configured to operate the plurality of UAVs as a swarm, generate at least one directive, and distribute the directive to the communication module of each UAV.

20 Claims, 6 Drawing Sheets

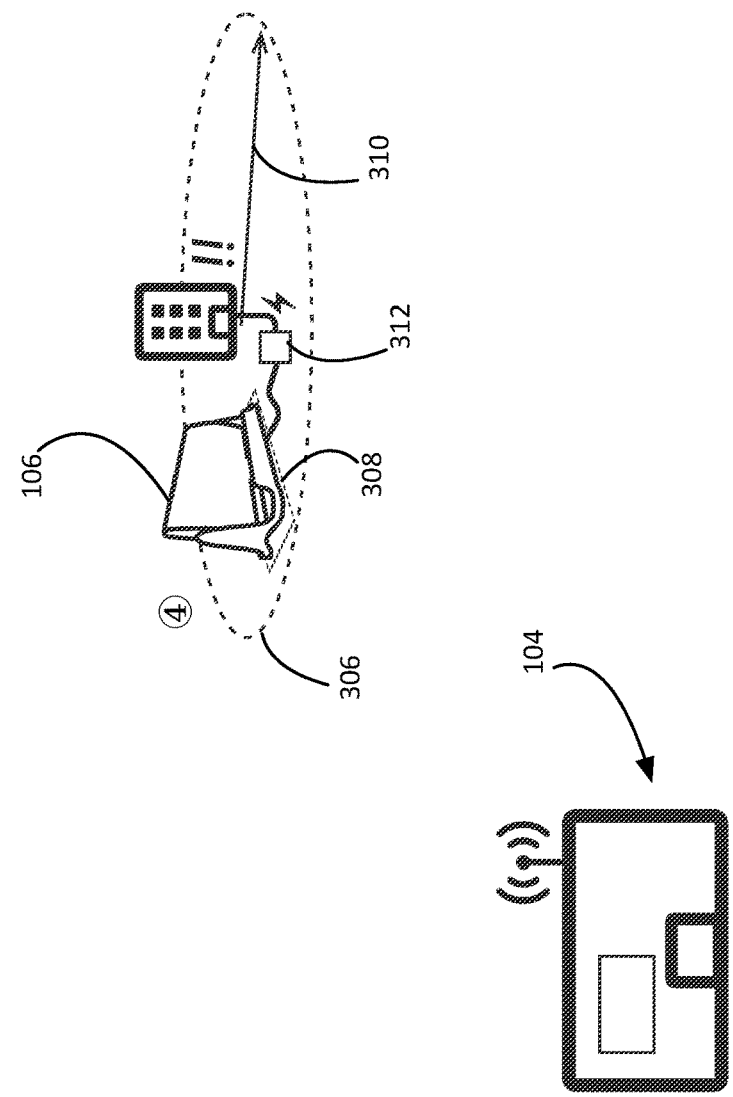
FIG. 3C
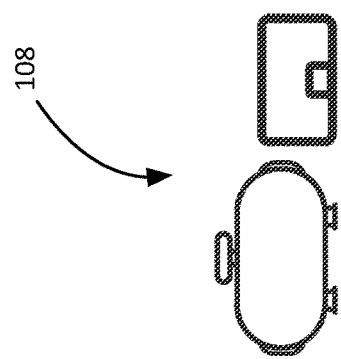

SYSTEM AND METHOD FOR WIRELESS POWER TRANSMISSION

RELATED APPLICATIONS

This application claims the benefit of U.S. provisional patent application 63/226,663, filed Jul. 28, 2021 titled "System and Method for Wireless Power Transmission," the entirety of the disclosure of which is hereby incorporated by this reference.

TECHNICAL FIELD

Aspects of this document relate generally to wireless power transmission.

BACKGROUND

There are a number of circumstances where electricity is needed, but wired power delivery is not available, convenient, or technologically feasible. Remote industrial, scientific, and military endeavors often journey beyond established infrastructure, making the operation more complicated, expensive, and dangerous. Furthermore, emergency situations such as natural disasters can knock out power grids, causing damage in a matter of minutes that can take days or weeks to repair. That same damage can also limit access to the affected area by ground vehicles, particularly tankers and other traditional ground-based fuel transportation.

Wireless power transmission could solve many of these problems. Conventional wireless power transmission currently uses electromagnetic (EM) radiation, such as in the radio-frequency (RF), infrared (IR), or optical range, and typically in the far-field regime, where the transmission distance is much longer than the EM radiation wavelength. However, this technology is still in its infancy, and requires solutions for a number of technical challenges before becoming practical. Because of the nature of the transmission, the efficiency of EM wireless power transmission falls off steeply with distance (e.g., ~2% at 1 km, and <1% at 10 km). This inefficiency is a problem compounded by the cost to implement such technology.

SUMMARY

According to one aspect, a system for wireless power transmission includes a plurality of unmanned aerial vehicles (UAVs), each having a transfer medium reservoir, an onboard power conversion unit including a fuel cell, a communication module, a navigation module, a power delivery interface having a range, and at least one sensor. Each UAV of the plurality of UAVs is configured to autonomously interface with a transfer medium source, and autonomously receive a chemical power transfer medium into the transfer medium reservoir of the UAV. The chemical power transfer medium is hydrogen gas produced by the transfer medium source. Each UAV is also configured to autonomously fly to a target area centered on a power recipient having a power demand. The target area has a size based at least in part on the range of the power delivery interface of the UAV. The UAV is guided by the navigation module. The flight of the UAV is powered by the onboard power conversion unit fueled by chemical power transfer medium obtained from the transfer medium source. Each UAV is also configured to autonomously identify a landing zone at least partially overlapping with the target area using at least one sensor, the landing zone sized and shaped to contain at least the smallest area required by the UAV for landing and takeoff. Each UAV is further configured to autonomously land within the landing zone, provide chemical power transfer medium to the onboard power conversion unit in fluidic communication with the transfer medium reservoir, the onboard power conversion unit being communicatively coupled to the power recipient, and evaluate at least one directive to decide what action to take based on feedback received from at least one of the communication module, the navigation module, and at least one sensor. The system also includes a fleet control system communicatively coupled to the plurality of UAVs. The fleet control system is configured to operate the plurality of UAVs as a swarm to meet the power demands of a plurality of power recipients. The fleet control system is configured to generate at least one directive whose evaluation, for a state of the swarm, will result in the allocation of UAVs to each power recipient of the plurality of power recipients such that the power demands of the plurality of power recipients are met. The at least one directive is generated using a mean-field model. The fleet control system is also configured to distribute the at least one directive to the communication module of each UAV of the swarm, such that all UAVs in the swarm are evaluating the same at least one directive.

Particular embodiments may comprise one or more of the following features. The power delivery interface may be wireless and may use near-field electromagnetic power transmission. Each UAV may be further configured to leave the transfer medium reservoir and the onboard power conversion unit within the target area to power the power recipient while the UAV takes off and continues to evaluate the at least one directive. Each UAV of the plurality of UAVs may be further configured to put the power delivery interface in fluidic communication with one of the endpoint power conversion unit and another transfer medium reservoir. The transfer medium source may be separated from the power recipient by more than 1000 km. The plurality of UAVs may be heterogeneous, and may include at least one VTOL UAV and/or at least one HTOL UAV.

According to another aspect of the disclosure, a system for wireless power transmission includes a plurality of unmanned aerial vehicles (UAVs), each including a transfer medium reservoir, an onboard power conversion unit, a communication module, a navigation module, a power delivery interface having a range, and at least one sensor. Each UAV of the plurality of UAVs is configured to interface with a transfer medium source, and receive a chemical power transfer medium into the transfer medium reservoir of the UAV. The chemical power transfer medium is produced by the transfer medium source. Each UAV is also configured to fly to a target area containing a power recipient having a power demand, the target area having a size based at least in part on the range of the power delivery interface of the UAV, the UAV being guided by the navigation module, and identify a landing zone at least partially overlapping with the target area using at least one sensor. The landing zone is sized and shaped to contain at least the smallest area required by the UAV for landing and takeoff. Each UAV is also configured to land within the landing zone, and provide chemical power transfer medium to an endpoint power conversion unit in fluidic communication with the transfer medium reservoir. The endpoint power conversion unit is communicatively coupled to the power recipient. Each UAV is also configured to evaluate at least one directive to decide what action to take based on feedback received from at least one of the communication module, the navigation module, and at least one sensor. The system also includes a fleet control system communicatively coupled to the plurality of UAVs. The fleet control system is configured to operate the plurality of UAVs as a swarm to meet the power demands of a plurality of power recipients. The fleet control system is also configured to generate at least one directive whose evaluation, for a state of the swarm, will result in the allocation of UAVs to each power recipient of the plurality of power recipients such that the power demands of the plurality of power recipients are met, and distribute the at least one directive to the communication module of each UAV of the swarm.

Particular embodiments may comprise one or more of the following features. The at least one directive may be generated by the fleet control system using a mean-field model. Each UAV of the plurality of UAVs may evaluate the same at least one directive distributed by the fleet control system. The chemical power transfer medium may be hydrogen gas. Each UAV may be further configured to interface with the transfer medium source, receive the chemical power transfer medium into the transfer medium reservoir, fly to the target area, identify the landing zone, and land within the landing zone autonomously. The onboard power conversion unit may be a fuel cell. For each power recipient, the endpoint power conversion unit may be the onboard power conversion unit of at least one UAV. For each UAV of the plurality of UAVs, the flight of the UAV may be powered by the onboard power conversion unit fueled by chemical power transfer medium obtained from the transfer medium source. The at least one directive may include a directive requiring departure from the landing zone before the chemical power transfer medium inside the transfer medium reservoir has been depleted beyond a critical fuel level. The at least one directive may include a directive resulting in a subset of UAVs flying in a formation when flying to the same location. The power delivery interface may be wireless and may use near-field electromagnetic power transmission. Each UAV may be further configured to leave the transfer medium reservoir and the onboard power conversion unit within the target area to power the power recipient while the UAV takes off and continues to evaluate the at least one directive. Each UAV of the plurality of UAVs may be further configured to put the power delivery interface in fluidic communication with one of the endpoint power conversion unit and another transfer medium reservoir. The transfer medium source may be separated from the power recipient by more than 1000 km. The plurality of UAVs may be heterogeneous, and may include at least one VTOL UAV and at least one HTOL UAV.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 3A-3C are schematic views of the role of a single UAV in wireless power transmission.

DETAILED DESCRIPTION

Figure 1:
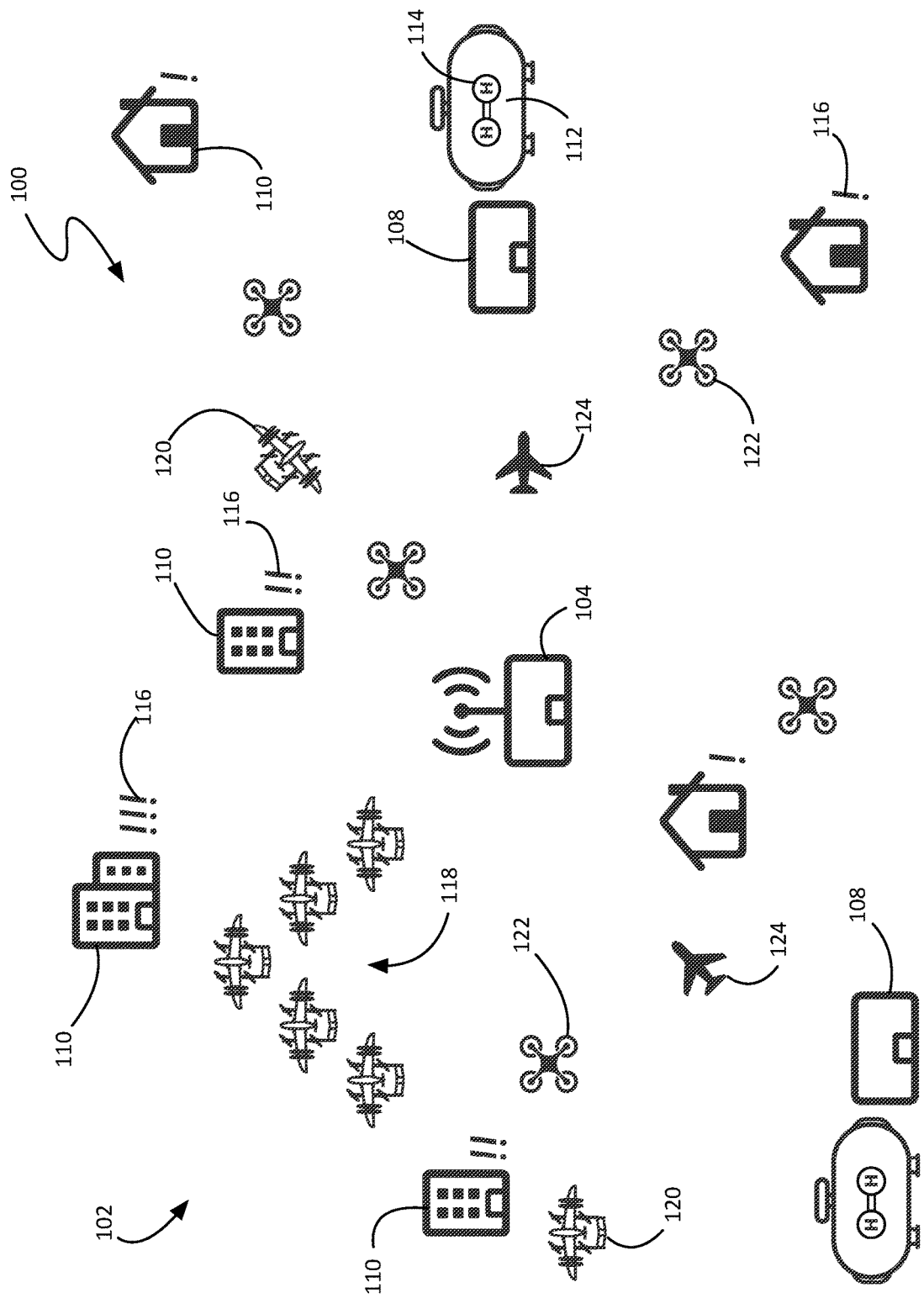
FIG. 1 is a schematic view of a system for wireless power transmission.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

There are a number of circumstances where electricity is needed, but wired power delivery is not available, convenient, or technologically feasible. Remote industrial, scientific, and military endeavors often journey beyond established infrastructure, making the operation more complicated, expensive, and dangerous. Furthermore, emergency situations such as natural disasters can knock out power grids, causing damage in a matter of minutes that can take days or weeks to repair. That same damage can also limit access to the affected area by ground vehicles, particularly tankers and other traditional ground-based fuel transportation.

Wireless power transmission could solve many of these problems. Conventional wireless power transmission currently uses electromagnetic (EM) radiation, such as in the radio-frequency (RF), infrared (IR), or optical range, and typically in the far-field regime, where the transmission distance is much longer than the EM radiation wavelength. However, this technology is still in its infancy, and requires solutions for a number of technical challenges before becoming practical. Because of the nature of the transmission, the efficiency of EM wireless power transmission falls off steeply with distance (e.g., ~2% at 1 km, and <1% at 10 km). This inefficiency is a problem compounded by the cost to implement such technology.

Contemplated herein is a system and method for wireless power transmission that outperforms conventional solutions in both efficiency and transmission range. Rather than employing far-field electromagnetic radiation to transfer energy to a remote location, the contemplated system for wireless power transmission (hereinafter "power transmission system" or "transmission system") makes use of one or more unmanned aerial vehicles (UAVs). In some embodiments, these UAVs are operated by a fleet control system that makes use of swarm allocation to efficiently meet the energy needs before the transmission system.

According to various embodiments, the contemplated transmission system converts power from an original source (e.g., solar/wind farm, fossil fuel power plant, hydroelectric plant, etc.) into chemical power (e.g., generating hydrogen gas, etc.) which is delivered via UAV to a remote location, where the chemical power/energy is converted into electrical power. This results in high efficiency, and substantially increased range compared to the state-of-the-art wireless transmission technologies. Some embodiments of the contemplated transmission system improve on state-of-the-art efficiencies tenfold or more.

According to various embodiments, the chemical power transfer medium is transported to a remote location by an unmanned aerial vehicle (hereinafter referred to as a UAV). In some embodiments, the chemical is converted into electrical power using a fuel cell, for use at the remote location. According to various embodiments, the UAV is able to fly to a destination and then interface with and provide power to receiving equipment via wiring or wirelessly while in close proximity. In some embodiments, the UAV can drop off a payload of said chemical power transfer medium (i.e., fuel), or a fuel payload and a fuel cell system (or other power generating system and fuel known in the art), at a destination.

According to various embodiments, the contemplated fleet control system and UAV enables power delivery to rural and off-grid communities, as well as any infrastructure-sparse locations. The contemplated transmission system also facilitates power delivery from sources that are difficult to reach, due to terrain or environmental sensitivities, or other concerns. Additionally, this transmission system can offer seamless power support following natural or human-caused calamities, adding resiliency to the existing and future grid, and relief when limited options exist and blackouts are common. The contemplated system, using chemical conversion, allows the challenging task of wireless power transmission to be solved by an effective, all-weather, all-terrain hydrogen delivery approach.

The contemplated wireless power transmission system avoids the use of far-field radiation, instead delivering power using a power-fuel-power conversion at an end-to-end efficiency that is much higher than electromagnetic approaches. As a specific example, in one embodiment, round-trip power-$H_2$-power conversion can be as efficient as ~50%, significantly higher than far-field EM transmission. According to various embodiments, this UAV-based system's efficiency in power transmission only very weakly falls off with distance, allowing wireless power transmission up to (and even over) 1000 km. This is in stark contrast to conventional EM-based transmission systems, whose efficiency sharply drops after a much shorter distance.

According to various embodiments, the contemplated transmission system may be implemented with minimal fixed infrastructure, permitting highly flexible operation and even infrequent, on-demand delivery without becoming inefficient. This also means that the system may be deployed quickly, growing incrementally as individual vehicles are built and put into service. This avoids the delays inherent to conventional systems that require a great deal more infrastructure to be created before becoming operational.

Wireless power transmission using the contemplated system can complement wired transmission, by delivering carbon-free power to isolated or inaccessible locations, and to augment grid resilience. Furthermore, it is able to do so at high efficiency versus distance, power, and flexibility, and at a lower cost.

The contemplated transmission system is flexible in how it is operated and deployed, able to adapt for use in a wide range of contexts and provide distributed operation at scale. In some embodiments, this transmission system may be implemented in contexts otherwise unavailable to conventional wireless power transmission systems. In some cases, such as long distance (e.g., overseas, etc.) transport, or transport from/to temporary locations, it is unclear whether wireless power transmission can be achieved using existing methods. The contemplated transmission systems' minimal infrastructure requirements can open up otherwise essentially non-existing applications.

Another advantage the contemplated system has over conventional solutions is scalability. According to various embodiments, power levels from a few kW to many MW are feasible. UAVs can be built to optimally match different needs, including scaling by increasing unit numbers put in operation (as opposed to building larger units).

Additionally, unlike large capital/infrastructure projects, the contemplated system can benefit from economies of mass production, where relatively small units are produced in large numbers. Also, in some embodiments, units of different sizes can be produced from the same set of basic parts.

According to various embodiments, UAVs can serve a wide range of roles, from local distribution to global transmission. Origins, destinations, and routes can be adapted quickly to fit evolving needs, strategic shifts, or unexpected events. This is accomplished through the contemplated fleet control system.

On a larger scale, the contemplated transmission system can provide economic and energy security (including grid resilience) and also help accelerate $CO_2$ emission reductions. In its broader role as an efficient energy carrier (not solely power delivery) platform, the contemplated transmission system can help improve economy-wide energy utilization. Furthermore, deployment and operational flexibility of the UAV is an opportunity for the just and equitable inclusion of all segments of society in the coming energy transition. It can also enable significant development in regions most heavily affected by fossil asset decommissioning or repurposing.

Like other modular systems, the UAV is scalable in quantity via mass production, offering fast learning curves and corresponding cost reductions with deployment, without large upfront investments. Because space constraints in aerial vehicles are not as strict as in ground vehicles, the UAV does not need to maximize pressure for the hydrogen it carries. Instead, pressure is an optimization parameter that can be adjusted for infrastructure-austere use cases, to avoid the need for specialized high-pressure (e.g., 700 bar) equipment.

The technology is also flexible with respect to application/end use, including dual uses. For example, as demand for hydrogen grows, the UAV technology can seamlessly adapt to deliver it, from the local to the global scale, by building up fleets of purpose-designed (e.g., prioritizing capacity, range, cost, etc.) UAVs.

FIG. 1 is a schematic view of a non-limiting example of a system 100 for wireless power transmission. As shown, the system 100 comprises a plurality of UAVs 106 designed and optimized to deliver power and/or a chemical power transfer medium 112. These UAVs 106 are organized into a swarm 102 by a fleet control system 104. The swarm 102 is configured to obtain a chemical power transfer medium 112 from one or more transfer medium sources 108 and fly to a power recipient 110 where power or the chemical power transfer medium 112 is provided to satisfy a power demand 116.

According to various embodiments, a UAV 106 is an unmanned aerial vehicle in which a large fraction or the majority of the aircraft volume is occupied by one or more chemical power transfer medium 112 such as pressurized hydrogen gas 114, which provide power for flight and at the destination, via a power conversion unit. The purpose of UAV 106 is wireless power transmission, such as in scenarios where wired power transmission is unavailable or insufficient, whereby the vehicle flies to the destination where it delivers power.

Depending on the use case, a UAV 106 delivers power in different configurations. For example, in one embodiment, the simplest configuration uses an onboard power conversion unit (e.g., a fuel cell power plant, etc.) to power the UAV's 106 flight and for power delivery at the power recipient 110. In some embodiments, the UAV 106 is optimized to carry hydrogen gas in pressure tanks inside (or integrated into) the fuselage, using a fraction of the onboard hydrogen for flight operations, reserving most for at-destination power (wired or near-field EM) delivery. In other embodiments, the flight of the UAV 106 may be powered by a different source (e.g., battery, solar, liquid fuel, etc.). For example, in one embodiment, the UAV 106 may be battery powered, and may simply deliver hydrogen fuel tanks to on-site hydrogen fuel cells.

The key distinguishing characteristic of UAV 106 is that it does not, or is not required to, employ inefficient transmission technologies such as far-field EM power transmission. Rather, the method is to convert power at the source into a chemical power transfer medium 112, fly the chemical power transfer medium 112 to a power recipient 110 having a power demand 116, and reconvert the chemical power transfer medium 112 to electricity on site. Depending on the scenario, various specific operating examples could be favorable.

In some embodiments, the UAV 106 uses its integral power plant (i.e., onboard power conversion unit) to fly to a destination as well as to generate and deliver power at the destination. Power delivery at the destination (i.e., power recipient 110) can be wired or wireless, but at very short distances from the receiving equipment (e.g., meters or centimeters), and therefore efficient. Other embodiments may use a detachable fuel tank and fuel cell, e.g., an onboard power conversion unit and transfer medium reservoir, which can be left at a power recipient 110 to provide power while the UAV 106 continues swarm operations. It is also possible to deliver chemical power transfer medium 112 only, to supply power generation equipment located on site.

As a specific example, in one embodiment, the UAV 106 may briefly deliver up to ~800 W after traveling up to ~10 km. In another embodiment, the UAV 106 may be capable of delivering ~5 kWe at >10 km and >20% efficiency, for more than 5 hours.

The fleet control system 104 is communicatively coupled to the plurality of UAVs 106, and is configured to operate the plurality of UAVs 106 as a swarm 102 to meet the power demands 116 of a plurality of power recipients 110. In some embodiments, the fleet control system 104 may be a single computing device having the needed communications hardware to communicate with the UAVs 106 and receive needed information such as the power demand 116 of a power recipient 110, weather reports, and the like. In other embodiments, the fleet control system 104 may comprise a number of devices (e.g., a distributed computing environment, a control device coupled to a network of ground stations, etc.).

It should be noted that while the following disclosure discusses the contemplated wireless power transmission system 100 and the UAVs 106 in the context of using hydrogen gas 114 as the chemical power transfer medium 112, other embodiments may make use of other chemical power transfer mediums 112, such as hydrocarbons and other substances that may be used to generate electricity. While many of the following embodiments are centered on working with hydrogen gas 114, those embodiments are exemplary and non-limiting. Those skilled in the art will recognize that the contemplated system 100, method, and unmanned aerial vehicle 106 may be adapted for use with other power generating materials.

While it would be possible to operate a transmission system 100 with one UAV 106, it would be advantageous to use a fleet (of potentially smaller UAVs 106), for example to allow for flight schedule interruptions, UAV losses or defects, other detrimental events, or simply to avoid the expense and time of building one-off units.

In some embodiments, the UAV flight controllers can be designed (or instructed by the fleet control system 104) to produce coordinated collective behaviors. As a specific example, in one embodiment the fleet control system 104 may be used to cause a subset of UAVs 106 enroute to the same location to fly in a formation 118. In the context of the present description and the claims that follow, a formation 118 is an aggregation of UAVs 106 into an aerodynamically efficient "flock" that reduces individual UAV 106 energy consumption, like a flock of migrating birds.

The contemplated wireless power transmission system 100 offers unprecedented deployment and operational flexibility, owing to two qualities: compatibility with infrastructure-austere environments (e.g., small footprint, vertical takeoff and landing, localized wireless power transmission, etc.), and a fleet control system 104 that is scalable with the number of UAVs 106 and robust to individual failures. The swarm framework contemplated herein enables multiple UAVs 106 to autonomously (re)distribute themselves based on real-time data, without the need for a central "dispatcher."

One of the greatest limitations to scaling a system making use of multiple UAVs 106 or other "swarm agents" is the need for human intervention or input. Even something as simple as plugging in a cable connecting a UAV 106 to a power recipient 110 input can erode system efficiencies when that action is required at dozens or even hundreds of locations multiple times a day. More demanding human intervention, such as piloting or landing, would cause the system to derail much earlier. As will be discussed in greater detail below with respect to FIGS. 3A-3C, according to various embodiments, each UAV 106 is configured to perform one or more functions or tasks autonomously (i.e., without requiring human intervention) or semi-autonomously (e.g., human input required in edge cases or malfunctions, human verification of automatically defined procedure required, etc.). These functions include, but are not limited to, interfacing with a transfer medium source 108 (e.g., automatically placing the UAV 106 in fluidic communication with the chemical power transfer medium 112 supply of transfer medium source 108 using robotics or a solution-specific architecture, etc.), receiving the chemical power transfer medium 112 into the transfer medium reservoir of the UAV 106, flying to a target area, identifying a landing zone, landing within the landing zone, and the like.

Most of the use cases for a wireless power transmission system 100 are likely to preclude the convenience of a landing strip for a horizontal take-off and landing (HTOL) UAV 124, even though they tend to be the more efficient form of air travel. Instead, in some embodiments, the UAV 106 is a vertical take-off and landing (VTOL) UAV 122, allowing it to land with a greatly reduced footprint, without the need for a long runway. Advantageously, the use of VTOL UAVs 122 facilitates the delivery of power much closer to where it will be used (i.e., power recipient 110). This means short range methods of distribution, such as near-field EM-based wireless transmission, may be used without the substantial losses previously discussed. This reduction in the amount of infrastructure needed to get the UAV 106 integrated into the power-starved systems means power can be restored or delivered quickly, without having to establish a wired connection between a landing strip and the power-starved systems.

In some embodiments, the plurality of UAVs 106 may be homogenous (e.g., all UAVs 106 are VTOL or HTOL, all UAVs 106 have the same storage capacity or maximum range, etc.). In other embodiments, the plurality of UAVs 106 may be heterogeneous. For example, in some embodiments, a combination of HTOL UAV 124 and VTOL UAV 122 may be used, creating a tiered supply chain organized by the fleet control system 104. The efficient, high capacity HTOL aircraft 124 could create centralized resupply centers from which a swarm of VTOL aircraft 122 can obtain the chemical power transfer medium 112 and take it to the power recipients 110 nearby. In still other embodiments, the UAV 106 may be a HTOL aircraft 124, which may be advantageous in use cases where the requirement of a runway is outweighed by the increased efficiency and range such an aircraft provides.

As another example, in another embodiment the plurality of UAVs 106 may comprise UAVs 106 having a variety of payload capacities. Such an arrangement may be advantageous, as the availability of smaller UAVs 106 means that power may be provided to power recipients 110 lacking sufficient room near the electrical load that will receive the power to land a larger UAV 106.

Figure 2A:
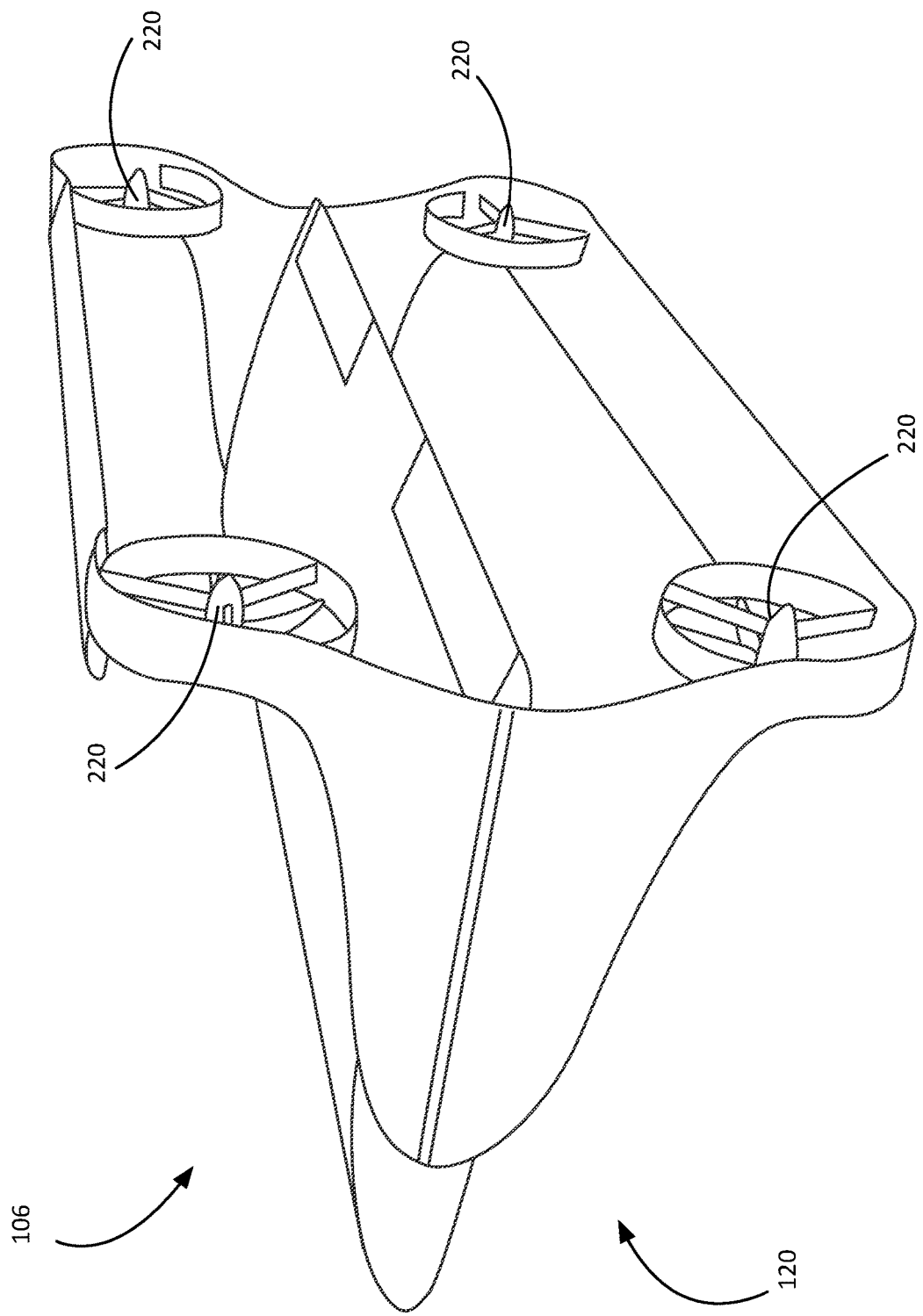
FIGS. 2A and 2B are perspective and schematic views of a UAV, respectively.
Figure 2B:
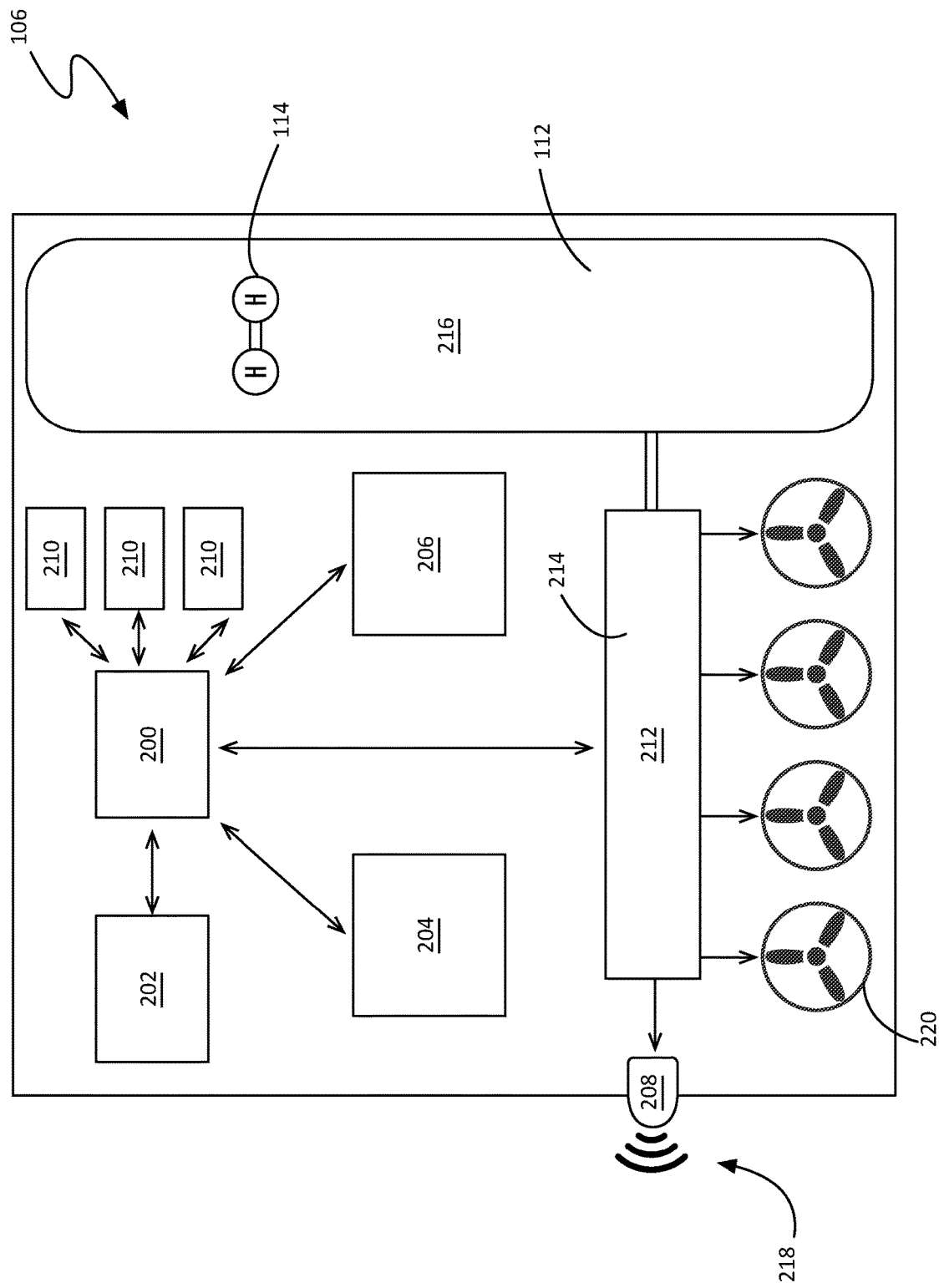

FIGS. 2A and 2B are perspective and schematic views of a non-limiting example of a UAV 106, respectively. The non-limiting example shown in FIG. 2A is a tail-sitting design, taking off and landing vertically using the four props to provide vertical thrust, and then flying horizontally using the same props, the aircraft tipping forward. Such a design is advantageous, as the internal hydrogen tanks may be modified to optimize the payload ratio. As an option, some embodiments may employ type V tanks. Other embodiments of the UAV 106 may use other VTOL, HTOL, or hybrid designs, as known in the art. In some embodiments, the airframe may be purpose-built to maximize the payload carried in the fuselage, while maintaining satisfactory vertical takeoff and landing (VTOL) and horizontal flight performance characteristics, including chemical power transfer medium 112 consumption per unit payload and distance.

FIG. 2B is a schematic view of a non-limiting example of a UAV 106 adapted for use in the contemplated transmission system 100. As shown, the UAV 106 comprises a microprocessor 200 communicatively coupled to a memory 202, a communication module 206, a navigation module 204, a transfer medium reservoir 216, a plurality of sensors 210, an onboard power conversion unit 212, a power delivery interface 208, and at least one engine 220. Those skilled in the art will recognize that FIG. 2B does not show various other systems common to aerial vehicles, such as servos that operate various control surfaces, and the like. FIG. 2B shows elements that play a role in the operation of the UAV 106 in the context of the contemplated transmission system 100 that provide advantages over conventional wireless power transmission systems.

As will be discussed in greater detail below, in some embodiments the fleet control system 104 provides one or more directives through which the behavior of a UAV 106 is governed. These directives (e.g., policies, rules, etc.) are stored in the memory 202 and evaluated by the microprocessor 200 using information provided by other elements, both within the UAV 106 and outside.

In the context of the present description and the claims that follow, a navigation module 204 is a module through which the position of the UAV 106 may be determined, and by which the UAV 106 may pilot itself. In some embodiments, the navigation module 204 comprises elements to determine an absolute position (e.g., a GPS receiver). In other embodiments, the navigation module 204 may also include one or more elements to determine a relative position (e.g., a position relative to other UAVs 106 in the swarm 102, relative to a transfer medium source 108, etc.) that may include a transponder. In some embodiments, the UAV 106 may be large enough that the laws of a particular jurisdiction where the UAV 106 is operating may require other forms of communication (e.g., radio identifier, signal lights, etc.).

In the context of the present description and the claims that follow, a communication module 206 is a module that allows the UAV 106 to receive instructions, send messages to other UAVs 106, and provide status reports or other telemetry to the transmission system 100. According to various embodiments, the communication module 206 may comprise a network interface, facilitating network communication between UAVs 106 and the fleet control system 104. In some embodiments, said communication may be through a self-forming mesh network formed by the plurality of UAVs 106. This may advantageously increase the range of communications without increasing the power consumption or cost of each aircraft, or requiring additional infrastructure to extend the reach of the transmission system 100. In other embodiments, the fleet control system 104 may comprise the infrastructure needed for operation at extended ranges (e.g., network of ground stations, etc.).

According to various embodiments, the UAVs 106 are configured to autonomously or semi-autonomously accomplish various objectives per instructions or directives received from the fleet control system 104 including, but not limited to, the cooperative transport of a payload (e.g., chemical power transfer medium 112, a power conversion unit, etc.) to a target location or at a target velocity, collision-free navigation in environments with obstacles, formation flying of subsets of the plurality of UAVs 106, robust trajectory tracking, and the like. According to various embodiments, the UAV 106 comprises various sensors 210 or other inputs to provide the fleet control system 104 and/or onboard microprocessor 200 with the needed information for autonomous (or semiautonomous) operation. Exemplary sensors 210 include, but are not limited to, cameras (e.g., machine vision, recognition of IR beacons, etc.), LiDAR (e.g., for landing in unpredictable terrain, etc.), rangefinders (e.g., laser rangefinders, etc.), radar, microphones, and the like.

The sensors 210 play a crucial role as the UAV 106 approaches its destination and needs to find an appropriate place to land, according to various embodiments. It is not unreasonable to assume that the topology of the area surrounding the transfer medium sources 108 is somewhat controllable and well-understood. According to various embodiments, those transfer medium sources 108 are attached to permanent infrastructure such as solar farms and power plants.

However, many of the use cases for the contemplated transmission system 100, particularly cases where the contemplated transmission system 100 is uniquely applicable, involve delivering power to locations that are, to some degree, unknown. As a specific example, using the contemplated transmission system 100 to deliver emergency power to an area otherwise cut off by the destruction caused by an earthquake or other catastrophic natural disaster may involve sending a UAV 106 to find a place to land that is close to the power recipient 110, among terrain that has changed in unknown but drastic ways. Satellite images or previous observations may not be of much use in such a case. Even in less dire circumstances, a UAV 106 may arrive at a destination and not have sufficient information to safely land.

According to various embodiments, the UAV 106 may be configured to pair observations made with the sensor 210 or sensors 210 with simultaneous localization and mapping (SLAM) technologies. SLAM allows the UAV 106 to construct or update a detailed map of an unknown environment while simultaneously keeping track of the UAVs 106 location within that environment. In some embodiments, a UAV 106 may apply SLAM methodology only to the information captured by its own sensors 210. In other embodiments, multiple UAVs 106 may share observations and collaborate in rapidly developing a detailed map of the area. In some embodiments, devices on the ground may be deployed to scan or otherwise capture the terrain surrounding the power recipient 110 (e.g., LiDAR, laser rangefinders, optical projections on the terrain observed by a camera, etc.). Those skilled in the art will recognize that other autonomous navigation and discovery methodologies, both known and yet to be developed, may be adapted for use within the contemplated transmission system 100.

As shown, the UAV 106 comprises a transfer medium reservoir 216, a vessel configured to contain the chemical power transfer medium 112 while in transit. In some embodiments, the UAV 106 may simply carry this payload to a destination already equipped to convert the chemical power transfer medium 112 into electricity. In other embodiments, the UAV 106 may also comprise the equipment to perform that conversion.

According to various embodiments, the UAV 106 may comprise an onboard power conversion unit 212. In the context of the present description and the claims that follow, an onboard power conversion unit 212 is a device or system that can take the chemical power transfer medium 112 (e.g., hydrogen gas, etc.) and convert it into electricity. Examples include, but are not limited to, fuel cells 214. In some embodiments, including the non-limiting example shown in FIG. 2B, the UAV 106 may power its flight using the onboard power conversion unit 212, while in other embodiments, the UAV 106 may use an alternate power source to drive one or more engines.

In some embodiments, the UAV 106 may simply drop the transfer medium reservoir 216 at the power recipient 110 and move on; the chemical power transfer medium 112 being converted into electricity by a conversion unit local to the power recipient 110. In other embodiments, the transfer medium reservoir 216 may remain coupled to the UAV 106, and the chemical power transfer medium 112 or generated electricity may be provided to the power recipient 110, another UAV 106 (e.g., a UAV 106 better suited for the next leg of the journey based on available area to land, etc.) or a local storage device (e.g., battery, another transfer medium reservoir 216 of another UAV 106, etc.) through a power delivery interface 208.

In the context of the present description and the claims that follow, a power delivery interface 208 is an interface configured to transfer or otherwise provide power in some form (e.g., electricity, a chemical power transfer medium 112, etc.) to a recipient. In some embodiments, the power delivery interface 208 may be a controllable valve in fluid communication with the transfer medium reservoir 216 of the UAV 106 and configured to couple with infrastructure local to the power recipient 110.

In some embodiments, the onboard power conversion unit 212 may be what ultimately generates the electricity for the power recipient 110. In some embodiments, the power delivery interface 208 may be a cable port configured to permit the onboard power conversion unit 212 to be communicatively coupled to an electrical load at the power recipient 110 through a cable.

In other embodiments, the power delivery interface 208 may be configured to wirelessly deliver electricity to the power recipient 110. As a specific example, in some embodiments including the non-limiting example shown in FIG. 2B, power may be delivered using near-field electromagnetic power transmission 218, which does not suffer from the inefficiencies of the far-field EM power transmission used in conventional systems. As an option, in some embodiments, the UAV 106 may provide power conditioning.

The power delivery interface 208 has an associated range that dictates how close the UAV 106 needs to land to the power recipient 110 or some other infrastructure in order to execute the transmission. The range may be determined by a number of characteristics including, but not limited to, the greatest acceptable loss due to wireless EM transmission or the length of the hose (i.e., delivering fluidic chemical power transfer medium 112) or cable (i.e., providing generated electricity).

In some embodiments, the flight of the UAV 106 may be powered using conventional methods (e.g., internal combustion engine with combustible fuel, electric engine powered by batteries and/or solar power, etc.). In other embodiments, including the non-limiting example shown in FIG. 2B, the engine 220 or engines 220 may be fueled by chemical power transfer medium 112 obtained from a transfer medium source 108. In some embodiments, the flight of the UAV 106 may be powered using electricity generated by the onboard power conversion unit 212 using chemical power transfer medium 112 stored in transfer medium reservoir 216. In other embodiments, the UAV 106 may further comprise a secondary transfer medium reservoir used to store chemical power transfer medium 112 that has been set aside for powering the UAV 106 itself.

Figure 3A:
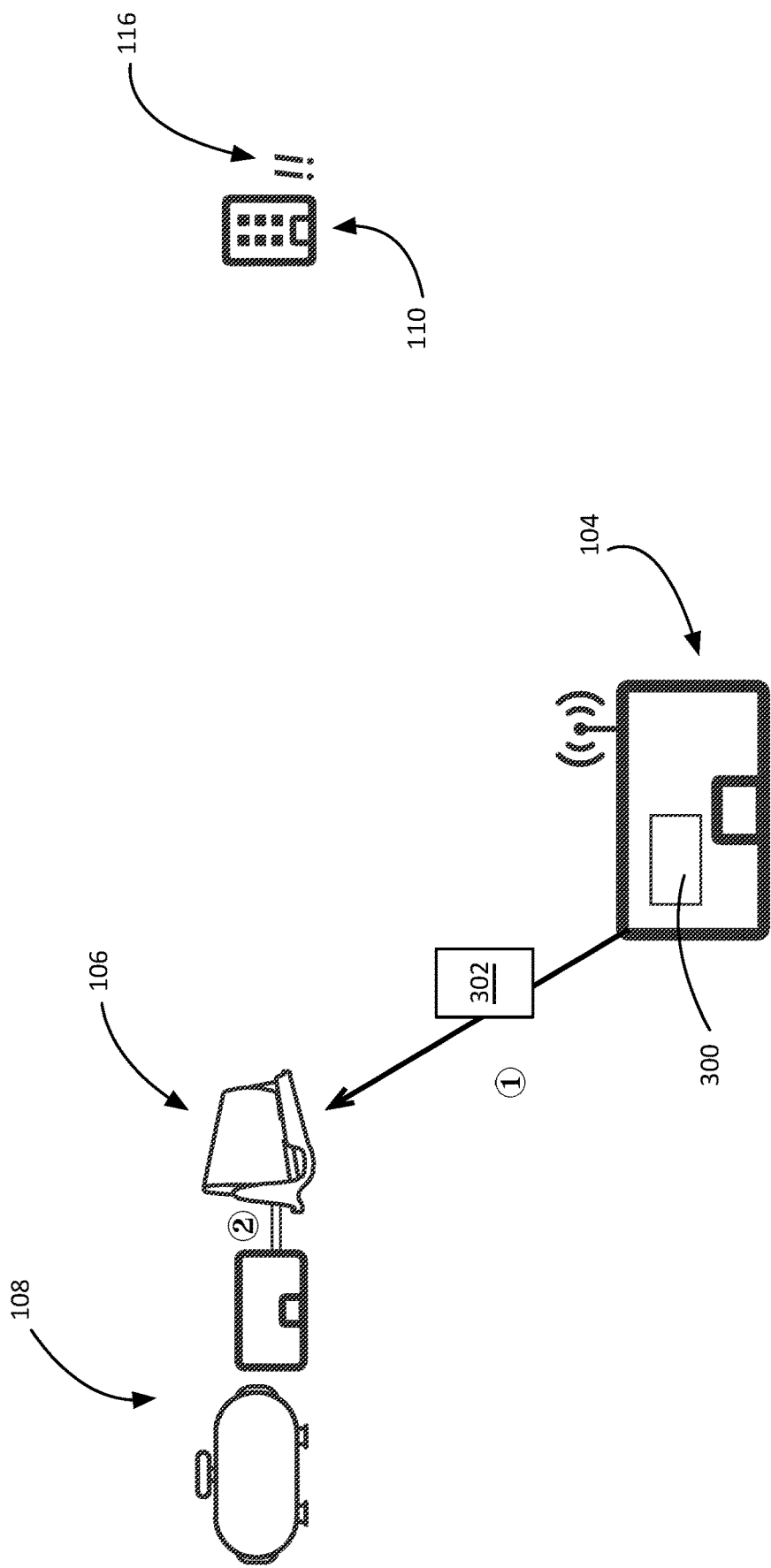
Figure 3B:
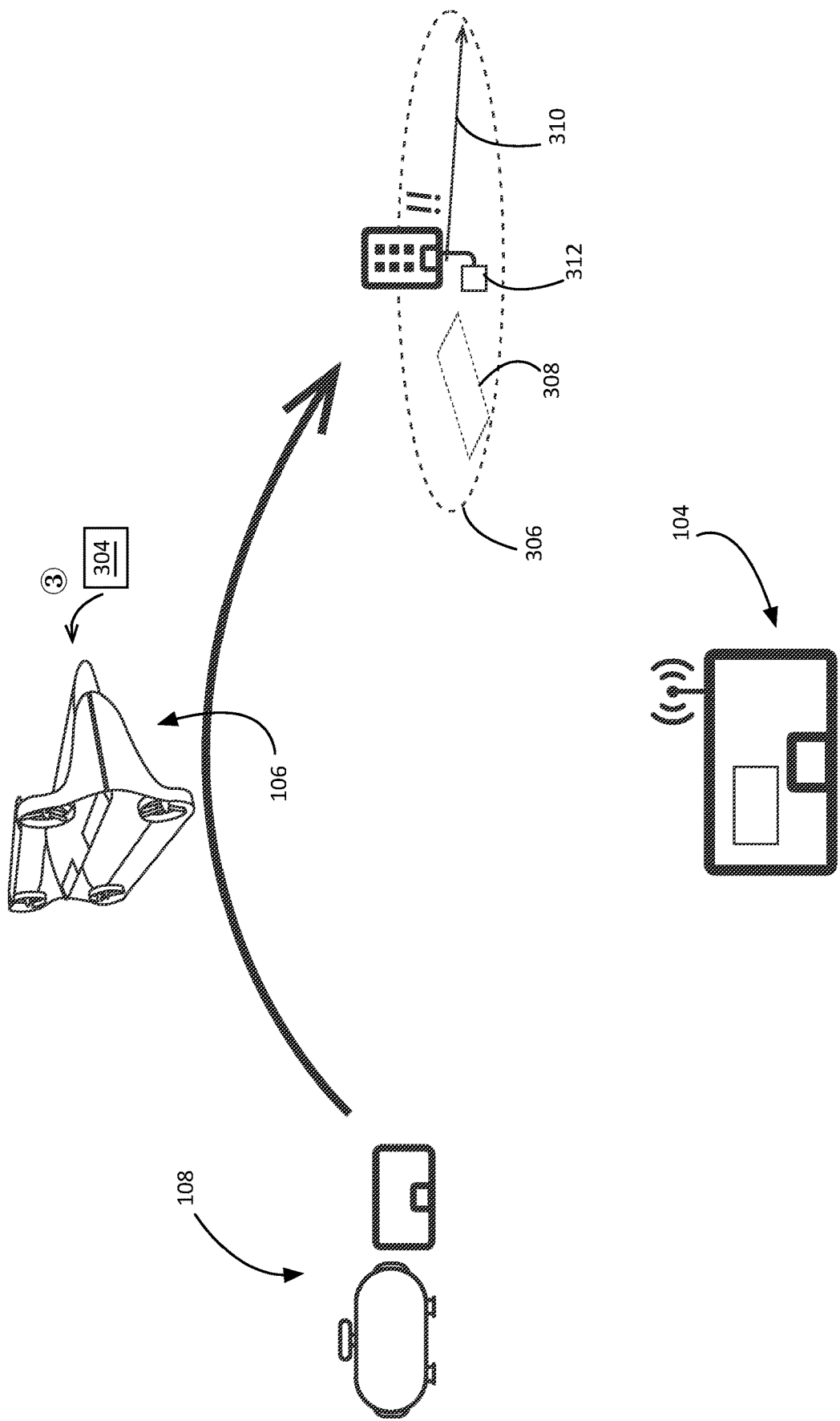

FIGS. 3A-3C are schematic views of the role played by a non-limiting example of a single UAV 106 interacting with a fleet control system 104 while implementing the contemplated wireless power transmission system 100. According to various embodiments, the fleet control system 104 is configured to operate a swarm 102 of UAVs 106, accomplishing desired tasks by overseeing the swarm 102 on a macroscopic level, as well as through influencing or direct definition or redefinition of microscale aspects such as the operating specifications and protocols of individual UAVs 106. Both scales will be discussed in greater detail, below.

According to various embodiments, the fleet control system 104 is configured to operate a plurality of UAVs 106 as a swarm 102, allocating them to different locations and resources to accomplish a macro-scale endeavor (e.g., transporting chemical power transfer medium 112 from a transfer medium source 108 to a power recipient 110, etc.). On a localized, micro-scale level, power storage may be controlled indirectly by the fleet control system 104 through a series of directives 302, depending on the power demand 116 of the electrical load at the power recipient 110. In some embodiments, this may also be accomplished by controlling the scheduling and the capacity of various sizes and multiple deliveries by UAVs 106, in some embodiments.

The fleet control system 104 contemplated herein for a swarm 102 or swarms 102 of UAVs 106 solves these problems at both the macroscale (i.e., the level of the swarm), and at the microscale (i.e., at the level of the individual UAV 106). According to various embodiments, problems at the macroscale include, but are not limited to, determining the number of UAVs 106 required at different power recipients 110, how to allocate the UAVs 106, and determining spatial configurations/densities of multiple UAVs 106 while in flight or when landing at a location (e.g., power recipient 110, transfer medium source 108, etc.). Solving such problems may require the use of global information such as topographic maps, weather forecasts, and current power demands 116 of the target power recipient 110.

According to various embodiments, problems at the microscale may include specifying directives 302 (i.e., the decision-making policies of each UAV 106 which determine the subsequent target locations and the conditions under which a UAV 106 decides to leave its current location; controllers that govern a UAV's 106 flight dynamics and its maneuvers in response to nearby UAVs 106 or obstacles; the type of information, if any, that a UAV 106 transmits to other UAVs 106 and to ground stations; etc.).

In the context of the present description and the claims that follow, a directive 302 is an instruction, policy, or criteria by which behavioral decisions (e.g., where to go, what to do, etc.) may be made by the UAV 106. The evaluation of a directive 302, for a particular state of the swarm 102 or a state of the UAV 106 doing the evaluation, cumulatively results in the allocation of UAVs 106 to each power recipient 110 of the plurality of power recipients 110 such that the power demands 116 of the plurality of power recipients 110 are met. According to various embodiments, the directives 302 are defined to produce UAV 106 behavior that leads to the accomplishment of the macroscopic goals of the system 100 as a whole.

According to various embodiments, the directives 302 are created/modified and distributed by the fleet control system 104. In some embodiments, directives 302 may be produced by the fleet control system 104 that are unique to a subset of the swarm 102. For example, in one embodiment, a directive 302 may be generated by the fleet control system 104 that is only received by the communication module 206 and subsequently evaluated on the microprocessor 200 of a single UAV 106. In other embodiments, the fleet control system 104 may produce a set of directives 302 that are identity invariant, and are distributed to the entire swarm 102 as a sort of universal "code of conduct", as will be discussed in greater detail, below.

Directives 302 may be defined to govern various behaviors influencing destinations for a UAV 106 based on its fuel level and current state (e.g., "while the UAV 106 is on the ground in a landing zone 308, if the chemical power transfer medium 112 inside the transfer medium reservoir 216 has been depleted beyond a critical fuel level, the UAV 106 must lift-off from the landing zone 308", "if the chemical power transfer medium 112 inside the transfer medium reservoir 216 of the UAV 106, while airborne, drops below a critical fuel level, the UAV 106 should redirect to the nearest transfer medium source 108", etc.).

Directives 302 may also be defined to govern various behaviors influencing destinations for a UAV 106 based on its current state, the states of other UAVs 106 nearby, and the spatial distribution of power demand (e.g., "if the UAV 106 is airborne and within a critical distance of one or more power recipients 110 signaling an increased and unmet power demand 116, and at least a critical number of other UAVs 106 are closer to the power recipient(s) 110 and capable of meeting this power demand, then divert to a more distant power recipient 110 with a probability that is a function of its power demand 116 and its distance from the UAV 106", etc.).

Directives 302 may also be defined to govern the velocity of a UAV 106 based on its current state and location, the states of other UAVs 106 nearby, and the spatial distribution of power demand (e.g., "if the UAV 106 is in a specific geographical region and is enroute to a power recipient 110, maintain a specific critical velocity unless it is necessary to perform maneuvers to avoid being within a critical distance of another UAV 106", "while airborne, the UAV 106 must avoid a specific geographical region due to adverse weather conditions there," etc.).

In some embodiments, directives 302 may also influence the behavior of the UAV 106 while enroute to a destination. For example, in some embodiments, the UAVs 106 of the swarm 102 may all be given one or more directives 302 that cause UAVs 106 that are traveling in the same direction, having trajectories that are close to each other (i.e., within a defined threshold distance), to be aggregated into aerodynamically efficient "flocks" that reduce individual UAV 106 energy consumption. As an option, this flocking behavior and/or other behaviors caused by directives 302 may also be incorporated into the standard operating procedures stored in the memory 202 of each UAV 106 at the time of manufacture (e.g., a default behavior).

According to some embodiments, micro-scale characteristics and behaviors of the UAVs 106 can be derived from macroscale specifications in a top-down fashion, to ensure satisfaction of global objectives. In these embodiments, many of the individual UAV 106 decision-making directives 302 may be implemented using just the local sensor information or local communication among UAVs 106. This is advantageous over conventional methods of control, as it enhances the scalability of the system 100, its resilience to individual UAV failures and errors, and its adaptability to large spatiotemporal variations in power demand.

According to various embodiments, the fleet control system 104 contemplated herein translates macroscale specifications, objectives, and demands for distributed aerial power delivery into microscale decision-making directives 302 and controllers for individual UAVs 106. These directives 302 may be continually adjusted by the fleet control system 104 to compensate for variations inherent to operating the transmission system 100 in a dynamic environment including volatile and unpredictable elements such as weather, hardware failure, unforeseen increases or decreases in power demand 116, and the like.

As previously mentioned, in some embodiments, including the non-limiting example shown in FIG. 3A, the set of directives 302 generated by the fleet control system 104 may be derived from macroscale specifications for problems on the scale of the entire swarm 102, such as problems of swarm reallocation among multiple tasks and redistribution over spatial regions and boundaries. According to various embodiments, this set of universal directives 302 may be derived from a mean-field model 300.

In the context of the present description and the claims that follow, a mean-field model 300 is defined on the set of probability densities that determine the probability of a UAV 106 being in one of a given set of discrete states (e.g., enroute to a transfer medium source 108, enroute to a power recipient 110, located in a particular geographical region) at a specific time. When the number of UAVs 106 in the swarm 102 is large, this model approximation is valid if all UAVs 106 follow the same set of directives 302. In other words, with a sufficiently large swarm 102, the dimension of the state space of the mean-field model 300 depends on the dimension of the state space of a single UAV 106 and is independent of the actual size of the swarm 102 (again, once the swarm 102 is sufficiently large). Such an approach is advantageous, as it makes the system 100 easy to scale up and easy to implement, as every UAV 106 is operating from the same set of rules. The mean-field model 300 may also provide the advantage of not requiring a centralized observer keeping watch over the states of the entire system 100, but instead the population densities of the various states of the UAVs 106 may be locally estimated by the UAVs themselves using peer-to-peer communication and/or encounter rates between UAVs. This may allow the system 100 to scale up in size geographically without requiring much additional infrastructure.

In some embodiments, the mean-field model 300 may also represent the spatiotemporal evolution of a quantity such as the distribution of unmet power demand 116 and the effect of the swarm 102 on this demand, which enables the formulation of optimization problems that are solved by the fleet control system 104 to determine directives 302 that will distribute the swarm 102 in order to decrease a particular function of the power demand 116 (e.g., to ensure that power demand at each power recipient 110 is below a critical threshold within a certain amount of time).

In some embodiments, the fleet control system 104 derives the directives 302 from a mean-field model of the swarm distribution among states over space and time. These embodiments may also apply methods from the fields of dynamics, control theory, and optimization to design UAV 106 control directives 302 that achieve micro-scale objectives, particularly in uncertain environments with no inter-UAV communication. Such objectives may include, but are not limited to, cooperative transport of a payload to a target location or at a target velocity, collision-free navigation in environments with obstacles, formation control, and robust trajectory tracking.

As shown in FIG. 3A, the mean-field model 300 is used to generate a set of directives 302 that are sent to the UAVs 106. See 'circle 1'. In some embodiments these directives 302 may be sent from the fleet control system 104 directly to each UAV 106, while in other embodiments the directives 302 may be disseminated throughout the swarm 102 via peer-to-peer interactions, which may be more efficient as it may not require as much transmitting power to reach all UAVs 106.

As shown, one of the UAVs 106 that received the set of directives 302 from the fleet control system 104 was parked next to a transfer medium source 108. The directives 302 include a policy that if the transfer medium reservoir 216 is low and the UAV 106 is parked next to a transfer medium source 108, the transfer medium reservoir 216 should be filled. In this specific example, the UAV 106 has an almost empty transfer medium reservoir 216, therefore the UAV 106 autonomously interfaces with the transfer medium source 108 and begins to fill. See 'circle 2'.

In some embodiments in which a power delivery interface 208 uses a physical conduit to connect to a transfer medium source 108 or a power recipient 110 (e.g., a hose for delivering fluidic chemical power transfer medium 112 or a cable for providing generated electricity), the conduit will be connected autonomously to the source or recipient by a flexible robotic manipulator arm composed of soft material (e.g., silicone). The robotic arm will be able to autonomously extend from the UAV 106 (e.g., using pneumatic actuators) and reconfigure such that its end-effector is connected at the appropriate location, which will be determined by the microprocessor 200 using information from one or more sensors 210 onboard the UAV 106. It will also be able to autonomously disengage its end-effector once the power transfer is complete and retract back into the UAV 106. The robotic arm may be reconfigured via a series of commands to its actuators, which are computed by the microprocessor 200 using a feedback controller that is stored in the memory 202 along with information provided by other elements (e.g., the sensor(s) 210), both within the UAV 106 and outside.

Continuing this specific example to FIG. 3B, once the transfer medium reservoir 216 has been filled, the UAV 106 continues to evaluate the directives 302 received from the fleet control system 104. According to various embodiments, the UAV 106 may be configured to autonomously evaluate the directives 302 to decide what action to take based on feedback 304 received from at least one of the communication modules 206 (e.g., a nearby power recipient 110 signaling an increased and unmet power demand 116, an instruction from the fleet control system 104, a transmission from another UAV 106 that it has fallen behind in a schedule, a warning of strong winds or heavy rain, etc.), the navigation module 204 (e.g., the current location of the UAV 106 is close to a power recipient 110 or transfer medium source 108, etc.), and one or more sensors 210 onboard the UAV 106 (e.g., LiDAR detecting a fallen branch obstructing a landing zone 308, laser rangefinder indicating that another UAV 106 has gotten too close, etc.). In the context of the present description and the claims that follow, feedback 304 refers to the various pieces of information offered to a member of the swarm 102, through which the state of the UAV 106 (and, in some embodiments, the state of one or more other UAVs 106) may be discerned or reliably estimated. This information may be directly observed by the UAV 106 (e.g., sensor readings, etc.), or observed by another entity and reported in a way discernable to the UAV 106 (e.g., weather report sent over radio, etc.).

In the specific example shown in FIG. 3B, the UAV 106, now carrying a full transfer medium reservoir 216, takes flight, per a directive 302 previously received from the fleet control system 104. While in flight, the UAV 106 receives feedback 304 from a nearby power recipient 110 that their power demand 116 unexpectedly increased and urgently needs more chemical power transfer medium 112. See 'circle 3'. In response, and in accordance with another directive 302, the UAV 106 redirects to the power recipient 110.

According to various embodiments, a UAV 106 may be configured to autonomously (or semi autonomously) fly to a target area 306 guided by the navigation module 204, the target area 306 containing a power recipient 110 having a power demand 116. In the context of the present description and the claims that follow, a target area 306 is an area containing a point of interest, such as a transfer medium source 108, a power recipient 110, and the like. In some embodiments, the target area 306 simply contains this point of interest, while in other embodiments the target area 306 may be centered on the point of interest. The target area 306 defines an area within which the UAV 106 needs to land in order to interact with the point of interest. It should be noted that while the target area 306 shown in FIG. 3B is circular, in other embodiments the target area 306 may have other shapes, depending on how it is defined. In some embodiments, the target area 306 may be defined as the area where the UAV 106 would be within reach of the point of interest (e.g., power recipient 110, etc.) if the ground was an empty plane, while in other embodiments the target area 306 may be defined as the usable area where the UAV 106 would be within reach of the point of interest. In other words, obstructions may change the defined shape of the target area 306, in those embodiments.

The target area 306 has a size (e.g., radius, principal dimension, etc.) that is based, at least in part, on the range 310 of the power delivery interface 208 of the UAV 106. In the context of the present description and the claims that follow, the range 310 of a power delivery interface 208 is the maximum separation between the power delivery interface 208 and the interaction target (i.e., power recipient 110) where said interaction is still possible. For example, in the case of a power delivery interface 208 making use of near-field electromagnetic power transmission 218, the range 310 would inherently be rather small. As another specific example, the range 310 of a power delivery interface 208 that uses a physical conduit (e.g., hoses for chemical power transfer medium 112, cables for electricity, etc.) would be the maximum length of conduit that is still usable. Put differently, the target area 306 is where a UAV 106 needs to land in order to carry out the task associated with that particular point of interest, according to various embodiments.

According to various embodiments, the UAV 106 may also be configured to autonomously identify a landing zone 308 that is at least partially overlapping with the target area 306 (e.g., at least the part of the UAV 106 having the power delivery interface 208 must be within the target area 306 and facing the power recipient 110, etc.). In the context of the present description and the claims that follow, a landing zone 308 is an area that is sized and shaped to contain at least the smallest area required by the UAV 106 for landing and takeoff. In the case of a VTOL UAV 122, the landing zone 308 may essentially be the footprint of the UAV 106 (i.e., the floorspace the UAV 106 takes up when on the ground). However, in the case of a HTOL UAV 124, the landing zone 308 may also include the required runway for landing/takeoff, in addition to the footprint when the UAV 106 is proximate the point of interest. According to various embodiments, the UAV 106 may be configured to autonomously identify a landing zone 308 using one or more onboard sensors 210 (e.g., cameras, LiDAR, etc.).

The UAV 106 may also be configured to autonomously land within the identified landing zone 308, guided by one or more sensors 210, as shown in FIG. 3C which continues the specific example discussed with respect to FIGS. 3A and 3B. See 'circle 4'.

According to various embodiments, the UAV 106 may be configured to autonomously provide chemical power transfer medium 112 to an endpoint power conversion unit 312 that is in fluidic communication with the transfer medium reservoir 216 of the UAV 106. In the context of the present description and the claims that follow, an endpoint power conversion unit 312 is a power conversion unit that is communicatively coupled to a power recipient 110 such that the electricity generated by the unit can be passed to the electrical load of the power recipient 110.

In some embodiments, including the non-limiting example shown in FIG. 3C, the endpoint power conversion unit 312 may be local to the power recipient 110, and not part of the UAV 106, which may still have its own onboard power conversion unit 212. In other embodiments, the endpoint power conversion unit 312 and the onboard power conversion unit 212 may be the same unit. For example, in one embodiment, the onboard power conversion unit 212 may remain onboard the UAV 106 and be communicatively coupled to the power recipient 110. In another embodiment, the UAV 106 may be configured to leave the transfer medium reservoir 216 and the onboard power conversion unit 212 within the target area 306 to power the power recipient 110, freeing the UAV 106 to take off and continue to evaluate directives 302 (e.g., retrieve an inactive endpoint power conversion unit 312 and empty transfer medium reservoir 216 from another power recipient 110, etc.).

In some embodiments, the UAV 106 may be configured to autonomously connect the transfer medium reservoir 216 directly to the endpoint power conversion unit 312 through the power delivery interface 208. In other embodiments, the UAV 106 may be configured to automatically put its power delivery interface 208 in fluidic communication with another transfer medium reservoir 216. As a specific example, in one embodiment, the power recipient 110 may have its own endpoint power conversion unit 312 and large transfer medium reservoir 216. Rather than leaving vessels behind to be later collected, a UAV 106 may autonomously couple its power delivery interface 208 to the large transfer medium reservoir 216 of the power recipient 110, adding chemical power transfer medium 112. Such an arrangement is more likely to be used in environments where the wireless power transmission was anticipated and is intended to continue into the future. Situations like provisioning emergency power for disaster relief would be better suited to rely on swapping tanks or direct transfer to electricity from a series of UAVs 106, rather than air dropping a large transfer medium reservoir 216.

In some embodiments, all activity performed by the UAV 106 may be done autonomously, or semi autonomously (i.e., with minimal human intervention). However, it should be noted that in other embodiments, one or more of the behaviors described above as being done autonomously may be possible to perform, or even required to be performed, manually. In some embodiments, required human intervention may be limited to edge cases, unlikely scenarios that would be difficult to deal with programmatically (e.g., landing a damaged UAV 106, etc.). In other embodiments, some activities may be required to be performed manually, out of necessity or due to the law (e.g., regulations governing the handling of combustible materials, laws regarding the operation of UAVs 106 above a certain weight, etc.).

The contemplated wireless power transmission system 100 has the potential to deliver power with a nearly constant efficiency (e.g., up to roughly 40%), while significantly expanding the opportunity space, especially distance (e.g., distances up to approximately 1000 km). Conventional wireless technologies typically have a tradeoff between efficiency and distance. To a first order approximation, one is inversely proportional to the other.

The potential applications for the contemplated transmission system 100 are numerous. One example would be power transmission during emergency situations, where main power is lost or even non-existent. Another example is difficult to access or protected areas, where the construction of a wired transmission infrastructure is not an option. Another application would be in military installations in which the risks and costs associated with surface fuel transport for power generation are significant. In this particular use case, the contemplated system can also offer risk mitigation (e.g., by enabling the delivery of many relatively small hydrogen payloads such that the loss of some of them can be tolerated). Another example would be power delivery to mining, construction, or similar sites, where permanent power delivery infrastructure does not exist and clean power generation is preferable to that by, for example, diesel generators. Another use would be temporary delivery to a location where construction is otherwise complete but wired power transmission to the location is not.

Where the above examples, embodiments and implementations reference examples, it should be understood by those of ordinary skill in the art that other systems and methods for wireless power transmission and examples could be intermixed or substituted with those provided. In places where the description above refers to particular embodiments of a system and method for wireless power transmission, it should be readily apparent that a number of modifications may be made without departing from the spirit thereof and that these embodiments and implementations may be applied to other power transmission technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for wireless power transmission, comprising:
a plurality of unmanned aerial vehicles (UAVs), each comprising a transfer medium reservoir, an onboard power conversion unit comprising a fuel cell, a communication module, a navigation module, a power delivery interface having a range, and at least one sensor, each UAV of the plurality of UAVs configured to:
autonomously interface with a transfer medium source;
autonomously receive a chemical power transfer medium into the transfer medium reservoir of the UAV, the chemical power transfer medium being hydrogen gas produced by the transfer medium source;
autonomously fly to a target area centered on a power recipient having a power demand, the target area having a size based at least in part on the range of the power delivery interface of the UAV, the UAV being guided by the navigation module, wherein the flight of the UAV is powered by the onboard power conversion unit fueled by chemical power transfer medium obtained from the transfer medium source;
autonomously identify a landing zone at least partially overlapping with the target area using at least one sensor, the landing zone sized and shaped to contain at least the smallest area required by the UAV for landing and takeoff;
autonomously land within the landing zone;
provide chemical power transfer medium to the onboard power conversion unit in fluidic communication with the transfer medium reservoir, the onboard power conversion unit being communicatively coupled to the power recipient; and
evaluate at least one directive to decide what action to take based on feedback received from at least one of the communication module, the navigation module, and at least one sensor;
a fleet control system communicatively coupled to the plurality of UAVs, the fleet control system configured to operate the plurality of UAVs as a swarm to meet the power demands of a plurality of power recipients, the fleet control system configured to:
generate at least one directive whose evaluation, for a state of the swarm, will result in the allocation of UAVs to each power recipient of the plurality of power recipients such that the power demands of the plurality of power recipients are met, wherein the at least one directive is generated using a mean-field model; and distribute the at least one directive to the communication module of each UAV of the swarm, such that all UAVs in the swarm are evaluating the same at least one directive.

2. The system of claim 1, wherein the power delivery interface is wireless and uses near-field electromagnetic power transmission.

3. The system of claim 1, wherein each UAV is further configured to leave the transfer medium reservoir and the onboard power conversion unit within the target area to power the power recipient while the UAV takes off and continues to evaluate the at least one directive.

4. The system of claim 1, wherein each UAV of the plurality of UAVs is further configured to put the power delivery interface in fluidic communication with one of the endpoint power conversion unit and another transfer medium reservoir.

5. The system of claim 1, wherein the transfer medium source is separated from the power recipient by more than 1000 km.

6. The system of claim 1, wherein the plurality of UAVs is heterogeneous, comprising at least one vertical takeoff and landing UAV and at least one horizontal takeoff and landing UAV.

7. A system for wireless power transmission, comprising:
a plurality of unmanned aerial vehicles (UAVs), each comprising a transfer medium reservoir, an onboard power conversion unit, a communication module, a navigation module, a power delivery interface having a range, and at least one sensor, each UAV of the plurality of UAVs configured to:
interface with a transfer medium source;
receive a chemical power transfer medium into the transfer medium reservoir of the UAV, the chemical power transfer medium being produced by the transfer medium source;
fly to a target area containing a power recipient having a power demand, the target area having a size based at least in part on the range of the power delivery interface of the UAV, the UAV being guided by the navigation module;
identify a landing zone at least partially overlapping with the target area using at least one sensor, the landing zone sized and shaped to contain at least the smallest area required by the UAV for landing and takeoff;
land within the landing zone;
provide chemical power transfer medium to an endpoint power conversion unit in fluidic communication with the transfer medium reservoir, the endpoint power conversion unit being communicatively coupled to the power recipient; and
evaluate at least one directive to decide what action to take based on feedback received from at least one of the communication module, the navigation module, and at least one sensor;

a fleet control system communicatively coupled to the plurality of UAVs, the fleet control system configured to operate the plurality of UAVs as a swarm to meet the power demands of a plurality of power recipients, the fleet control system configured to:
generate at least one directive whose evaluation, for a state of the swarm, will result in the allocation of UAVs to each power recipient of the plurality of power recipients such that the power demands of the plurality of power recipients are met; and
distribute the at least one directive to the communication module of each UAV of the swarm.

8. The system of claim 7, wherein the at least one directive is generated by the fleet control system using a mean-field model and wherein each UAV of the plurality of UAVs evaluates the same at least one directive distributed by the fleet control system.

9. The system of claim 7, wherein the chemical power transfer medium is hydrogen gas.

10. The system of claim 7, wherein each UAV is further configured to interface with the transfer medium source, receive the chemical power transfer medium into the transfer medium reservoir, fly to the target area, identify the landing zone, and land within the landing zone autonomously.

11. The system of claim 7, wherein the onboard power conversion unit is a fuel cell.

12. The system of claim 7, wherein, for each power recipient, the endpoint power conversion unit is the onboard power conversion unit of at least one UAV.

13. The system of claim 7, wherein, for each UAV of the plurality of UAVs, the flight of the UAV is powered by the onboard power conversion unit fueled by chemical power transfer medium obtained from the transfer medium source.

14. The system of claim 13, wherein the at least one directive comprises a directive requiring departure from the landing zone before the chemical power transfer medium inside the transfer medium reservoir has been depleted beyond a critical fuel level.

15. The system of claim 7, wherein the at least one directive comprises a directive resulting in a subset of UAVs flying in a formation when flying to the same location.

16. The system of claim 7, wherein the power delivery interface is wireless and uses near-field electromagnetic power transmission.

17. The system of claim 7, wherein each UAV is further configured to leave the transfer medium reservoir and the onboard power conversion unit within the target area to power the power recipient while the UAV takes off and continues to evaluate the at least one directive.

18. The system of claim 7, wherein each UAV of the plurality of UAVs is further configured to put the power delivery interface in fluidic communication with one of the endpoint power conversion unit and another transfer medium reservoir.

19. The system of claim 7, wherein the transfer medium source is separated from the power recipient by more than 1000 km.

20. The system of claim 7, wherein the plurality of UAVs is heterogeneous, comprising at least one vertical takeoff and landing UAV and at least one horizontal takeoff and landing UAV.

* * * * *